US011395252B2

(12) United States Patent
Issakov et al.

(10) Patent No.: US 11,395,252 B2
(45) Date of Patent: Jul. 19, 2022

(54) CROWD SOURCED RTT-BASED POSITIONING

(71) Applicant: Skyhook Wireless, Inc., Boston, MA (US)

(72) Inventors: Simon Issakov, Wayne, PA (US); Larry V. Dodds, Chester Springs, PA (US); Robert J. Anderson, Bryn Mawr, PA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 16/937,329

(22) Filed: Jul. 23, 2020

(65) Prior Publication Data

US 2022/0030536 A1 Jan. 27, 2022

(51) Int. Cl.
*H04J 3/06* (2006.01)
*H04W 24/00* (2009.01)
(Continued)

(52) U.S. Cl.
CPC ......... *H04W 56/0065* (2013.01); *G01S 5/021* (2013.01); *G01S 5/0242* (2013.01);
(Continued)

(58) Field of Classification Search
CPC . H04W 56/0065; H04W 4/80; H04W 64/003; G01S 5/021; G01S 5/0242; G06F 16/23; G06F 16/29
(Continued)

(56) References Cited

U.S. PATENT DOCUMENTS 8,213,957 B2 7/2012 Bull et al.
8,565,782 B2 10/2013 McAleenan et al.
(Continued)

FOREIGN PATENT DOCUMENTS

WO WO-2017/196510 A1 11/2017

OTHER PUBLICATIONS

"Notification of Transmittal of the International Search Report and the Written Opinion of the International Searching Authority, or the Declaration," International Filing Date: Mar. 30, 2021, International Application No. PCT/US2021/024874, Applicant: Skyhook Wireless, Inc., dated Jun. 28, 2021, pp. 1-17.
(Continued)

*Primary Examiner* — Mark G. Pannell
(74) *Attorney, Agent, or Firm* — Cesari and McKenna, LLP; James A. Blanchette

(57) ABSTRACT

In various embodiments, crowd sourcing techniques are provided to enable RTT-based positioning of UE. To address issues of discovering which beacons (e.g., Wi-Fi APs, cellular base stations, BLE transmitters, etc.) support measurement of RTT (e.g., according to IEEE 802.11mc, 3GPP Release 16, etc.), beacon RTT capabilities may be crowd-sourced from UE and maintained by a cloud-based location platform in a beacon database (or more specifically, a RTT database portion thereof). To address the issue of determining physical antenna positions, RTT measurements may be crowd-sourced from UE for those beacons that are RTT capable, and used by a trilateration algorithm (e.g., a WLS multilateration algorithm) to determine physical antenna positions, which also may be maintained in the beacon database. Accuracy of the trilateration may be enhanced by obtaining raw GNSS measurements (e.g., psuedoranges) from the UE, and performing a cloud-based RTK GNSS position fix for the UE.

17 Claims, 7 Drawing Sheets

(51) Int. Cl.
*H04W 56/00* (2009.01)
*H04W 4/80* (2018.01)
*G06F 16/23* (2019.01)
*G06F 16/29* (2019.01)
*G01S 5/02* (2010.01)
*H04W 64/00* (2009.01)

(52) U.S. Cl.
CPC ............... *G06F 16/23* (2019.01); *G06F 16/29* (2019.01); *H04W 4/80* (2018.02); *H04W 64/003* (2013.01)

(58) Field of Classification Search
USPC .......................................................... 370/350
See application file for complete search history.

(56) References Cited

U.S. PATENT DOCUMENTS

| | | | |
|---|---|---|---|
| 8,655,377 B2 | 2/2014 | Soma et al. | |
| 8,934,919 B2 | 1/2015 | Tenny | |
| 9,247,446 B2 | 1/2016 | Das et al. | |
| 9,801,019 B2 | 10/2017 | Nallampatti Ekambaram et al. | |
| 10,674,331 B1* | 6/2020 | Huang | H04W 4/023 |
| 2012/0071201 A1* | 3/2012 | Chisaka | H04W 36/0055 |
| | | | 455/524 |
| 2012/0294231 A1* | 11/2012 | Finlow-Bates | H04W 48/14 |
| | | | 370/328 |
| 2013/0307723 A1* | 11/2013 | Garin | G01S 5/0284 |
| | | | 342/357.29 |
| 2014/0171097 A1 | 6/2014 | Fischer et al. | |
| 2014/0269400 A1 | 9/2014 | Aldana et al. | |
| 2014/0274161 A1* | 9/2014 | Venkatraman | H04W 4/025 |
| | | | 455/456.6 |
| 2016/0044504 A1 | 2/2016 | Edge | |
| 2016/0191775 A1* | 6/2016 | Naguib | H04N 1/00315 |
| | | | 348/207.11 |
| 2020/0107288 A1 | 4/2020 | Kumar et al. | |
| 2020/0249310 A1* | 8/2020 | Wirola | G01S 5/14 |
| 2021/0321219 A1* | 10/2021 | Rauhala | G01S 5/14 |

OTHER PUBLICATIONS

Hereman, Willy, "Trilateration: The Mathematics Behind a Local Positioning System," Presentation, Department of Mathematical and Computer sciences, Colorado School of Mines, Golden, Colorado, USA, Department of Computer Engineering Turgut Özal University, Keçiören,Ankara, Turkey, Jun. 21, 2011, pp. 1-37.

Huilla, Sami, "Smartphone-based Indoor Positioning Using Wi-Fi Fine Timing Measurement Tool," Master of Science Thesis, University of Turku, Department of Future Technologies, Communication Systems, Sep. 2019, pp. 1-82.

Šeleng, Maroš, "WiFi Round Trip Time for Indoor Navigation," Master Thesis, Masaryk University, Faculty of Informatics, Brno, Spring 2019, pp. 1-85.

Thorpe, Mike, et al., "LTE Location Based Services Technology Introduction: White Paper," 1SP05, Rhode & Schwarz GmbH & Co. KG, Sep. 2013, pp. 1-13.

* cited by examiner

CROWD SOURCED RTT-BASED POSITIONING

BACKGROUND

Technical Field

The present disclosure relates generally to user equipment (UE) positioning, and more specifically to crowd sourcing techniques to enable round-trip time (RTT)-based positioning of UE.

Background Information

Determining UE position is becoming increasing important for tracking users, managing profiles, providing location-based services, and other tasks. A number of techniques for determining UE position have involved received signal strengths (RSS) measurements. For example, a triangulation of RSS measurements of signals received at the UE from multiple beacons (e.g., Wi-Fi access points (APs), cellular base stations, Bluetooth Low-Energy (BLE) transmitters, etc.) may be performed. However, RSS-based techniques may have difficulty determining high precision UE positions.

Improved precision may be possible by utilizing RTT measurements in the determination of UE position. In general, RTT is the time that passes between the transmission of an initiating signal and the reception of a corresponding response signal. Time-of-flight (ToF) may be obtained by subtracting turnaround time from RTT, and dividing the result by two. From ToF a distance (range) between the UE and the beacon may be readily determined. Based on the distance to multiple beacons, the position of the UE may be determined, for example via trilateration.

Various new protocols, such as the fine timing measurement (FTM) protocol introduced in the Institute of Electrical and Electronics Engineers (IEEE) 802.11mc standard, and the protocols introduced in the 3rd Generation Partnership Project (3GPP) Release 16 technical specification (TS) series 37 and 38, enable highly accurate measurement of RTT. With a Wi-Fi AP that supports FTM protocol, RTT may be measured from timestamps that are captured at departure and arrival of FTM frames and their respective acknowledgements. With a cellular base station that supports that supports 3GPP Release 16, a specific sub-type of RTT referred to as multi-RTT may be measured.

UE may use various mechanisms to discover which beacons support measurement of RTT. For example, FTM protocol provides two mechanisms for discovering which Wi-Fi APs support RTT measurements: advertisement frames and range requests. With advertisement frames, a Wi-Fi AP periodically broadcasts a frame to advertise to UE its RTT capabilities. With range requests, UE establish a peer link to the Wi-Fi AP and attempt to have the Wi-Fi AP measure RTT with it, sending a request frame and waiting to receive a burst of response frames, to which it responds with acknowledgements. With either advertisement frames or range requests, an extended capabilities element (e.g., included in an advertisement frame or in an initial response frame) may provide information regarding scheduling and operational details of the FTM session, such as burst duration, FTM frames per burst, bandwidth, minimum time between consecutive FTM frames, and the like. Likewise, 3GPP Release 16 provides its own mechanisms to discover which cellular base stations support RTT.

While using RTT may improve precision of UE position determination, a number of obstacles have hindered the widespread deployment of RTT-based positioning. First, it is often error prone and operationally expensive (in terms of time, processor cycles, memory space, network bandwidth and power) to determine which beacons support measurement of RTT. Some beacons may simply lack the functionality to support measurement of RTT (e.g., they only support older protocols and standards). Other beacons may include the functionality (e.g., their chipset supports the applicable protocols and standards) but they do not advertise their RTT capabilities for various reasons. For example, with FTM protocol, only a fraction of deployed Wi-Fi APs currently support the IEEE 802.11mc standard and FTM protocol. Of that fraction, some Wi-Fi APs do not advertise their capabilities to support FTM protocol. UE interested in learning which Wi-Fi APs support FTM protocol typically have two sub-optimal options: they can rely on advertisements, and thereby miss Wi-Fi APs that do not advertise their capabilities, or they can establish peer links and send request frames to each nearby Wi-Fi AP, and thereby consume significant time, processor cycles, memory space, network bandwidth and power. In a dense urban area, there may be tens or even hundreds of nearby Wi-Fi APs such that having every UE establish peer links and send request frames to every nearby Wi-Fi AP is simply be too operationally expensive to be practical.

Second, it may be difficult to determine physical antenna positions to a level of precision that can fully realize the benefits for RTT-based positioning. RTT-based positioning typically requires highly accurate physical antenna positions (e.g., within 1 meter) to realized its full benefits. One way to obtain such physical antenna positions is by dedicated surveys. For example, a Wi-Fi survey system or vehicle including high-precession hardware may traverse a site and map physical antenna positions of Wi-Fi APs. While the physical antenna positions determined by such an approach may be accurate, it is extremely time consuming and expensive. An alternative approach is to approximate physical antenna positions based on coverage areas of beacons, which may already be known from other positioning techniques. For example, a physical antennal position of a Wi-Fi AP may be approximated as the centroid of coverage of the Wi-Fi AP. However, such an approach is generally not very accurate. The centroid of coverage often diverges from the physical antenna position due to signal propagation biases, observational biases and other factors.

Accordingly, there is a need for improved techniques that can address these and/or other issues that have hindered widespread deployment of RTT-based positioning of UE.

SUMMARY

In various embodiments, crowd sourcing techniques are provided to enable RTT-based positioning of UE. To address issues of discovering which beacons (e.g., Wi-Fi APs, cellular base stations, BLE transmitters, etc.) support measurement of RTT (e.g., according to IEEE 802.11mc, 3GPP Release 16, etc.), beacon RTT capabilities may be crowd-sourced from UE and maintained by a cloud-based location platform in a beacon database (or more specifically, a RTT database portion thereof). To address the issue of determining physical antenna positions, RTT measurements may be crowd-sourced from UE for those beacons that are RTT capable, and used by a trilateration algorithm (e.g., a weighted least square (WLS) multilateration algorithm) to determine physical antenna positions, which also may be maintained in the beacon database. Accuracy of the trilateration may be enhanced by obtaining raw global navigation satellite system (GNSS) measurements (e.g., psuedoranges) from the UE, and performing a cloud-based Real Time Kinematic (RTK) GNSS position fix for the UE.

In one embodiment, a positioning client on UE is used to crowd-source beacon RTT capabilities. The UE uses a wireless network interface to scan for beacons within range of the UE. The UE accesses information from a beacon database maintained by a cloud-based location platform to determine whether RTT capabilities are known for each beacon within range. For one or more beacons having unknown RTT capabilities, the UE sends a range request to attempt to have the beacon measure RTT, and based thereon assigns the beacon a RTT measurement status that indicates the beacon's RTT capabilities. The UE then uploads at least the RTT measurement status to the cloud-based location platform to update the beacon database. In such embodiment, the UE both consumes information regarding RTT capabilities of beacons from the beacon database, and contributes information regarding RTT capabilities of beacons to the beacon database.

In another embodiment, a cloud-based location platform is used to crowd-source beacon RTT capabilities. The cloud-based location platform provides a plurality of UE with information regarding RTT capabilities of beacons from a beacon database. At least one of the beacons initially has unknown RTT capabilities. The cloud-based location platform later receives RTT information including at least RTT measurement status from one or more of the plurality UE that have attempted to measure RTT with the beacon initially having unknown RTT capabilities. RTT capabilities of the beacon are determined based on the received RTT measurement status and the beacon database is updated to include information indicating the RTT capabilities of the beacon. In such embodiment, the operation permits UE to both consume information regarding RTT capabilities of beacons from the beacon database, and contribute information regarding RTT capabilities of beacons to the beacon database.

In yet another embodiment, a cloud-based location platform determines beacon position, or more specifically beacon physical antenna position, based on crowd-sourced data. The cloud-based location platform receives observations from a plurality of UE that have observed a beacon, the observations including at least a determined position of the UE and a RTT measurement for the UE by the beacon. The cloud-based location platform uses a trilateration algorithm to determine physical antenna position of the beacon based on the determined position and the RTT measurement for each of the plurality of UE. The cloud-based location platform updates the beacon database to include the determined physical antenna position of the beacon and provides the physical antenna position of the beacon to one or more of the plurality of UE. In such embodiment, the operation permits UE to both contribute information used to determine physical antenna position of the beacon to build the beacon database and consume physical antenna position of the beacon from the beacon database.

In still another embodiment, a cloud-based location platform determines beacon position, or more specifically beacon physical antenna position, based on crowd-sourced data, where accuracy of such determination is improved using a cloud-based RTK GNSS position fix for UE position. The cloud-based location platform receives information from a plurality UE that have observed a beacon including at least raw GNSS measurements for the UE and a RTT measurement for the UE. It also obtains RTK correction information from a correction service for the raw GNSS measurements. The cloud-based location platform determines a corrected GNSS position fix for each UE using the raw GNSS measurements and the RTK correction information. Thereafter, the cloud-based location platform use a trilateration algorithm to determine position of the beacon based on the corrected GNSS position fix and the RTT measurements, and updates a beacon database to include the determine physical antenna position of the beacon. It then provides the physical antenna position of the beacon to one or more of the plurality of UE.

It should be understood that the embodiments discussed in this Summary may include a variety of other features, including other features discussed below, and variations thereof. Further a variety of other embodiments may be utilized involving various combinations of the features discussed herein and below, and variations thereof. This Summary is intended simply as a brief introduction to the reader, and does not imply that the specific features mentioned herein are all the features of the invention, or are essential features of the invention.

BRIEF DESCRIPTION OF THE DRAWINGS

The description below refers to the accompanying drawings, of which.

DETAILED DESCRIPTION

Figure 1:
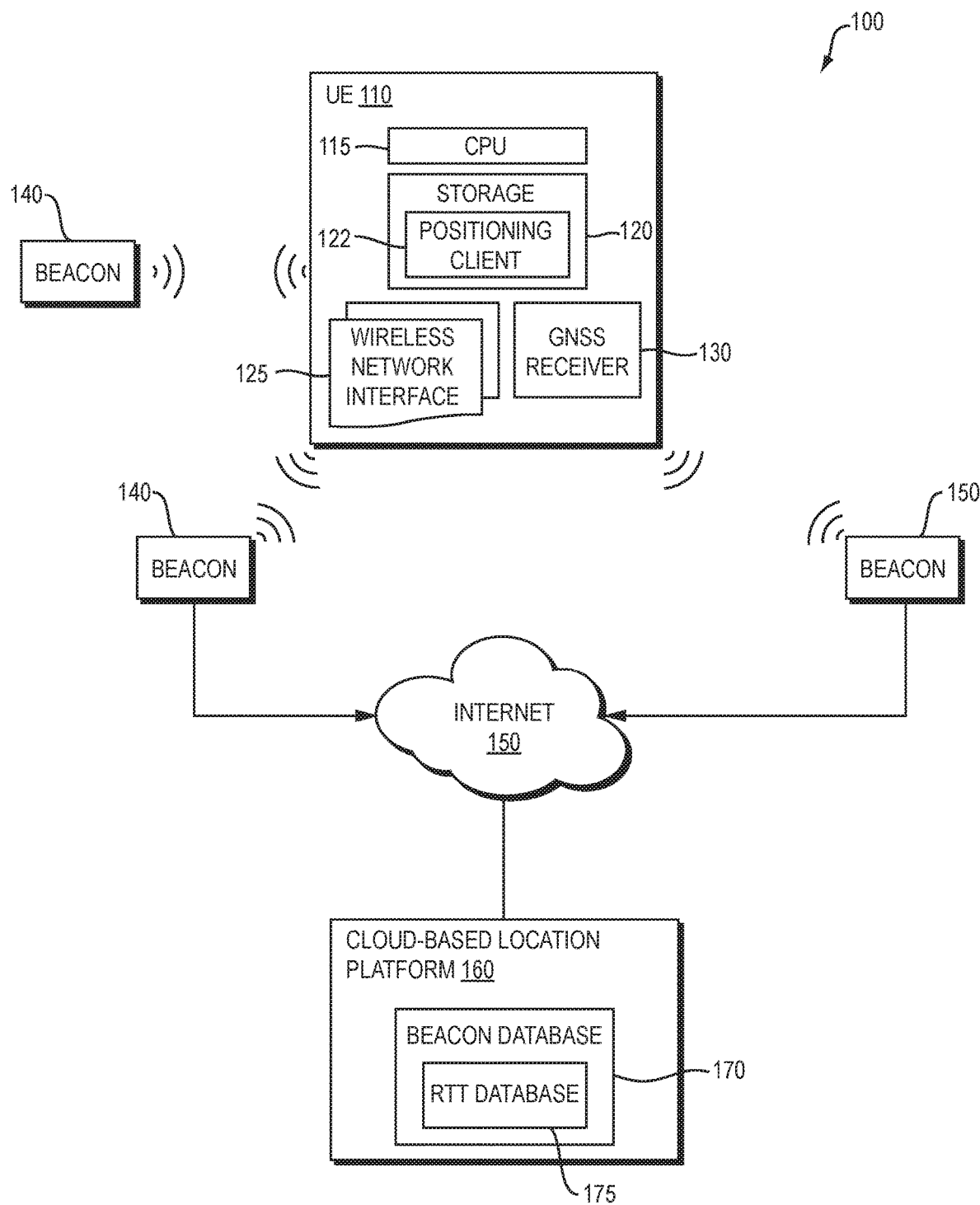
FIG. 1 is a block diagram of an example architecture in which techniques to enable RTT-based positioning of UE may be deployed.

FIG. 1 is a block diagram of an example architecture 100 in which techniques to enable RTT-based positioning of UE may be deployed. As used herein, the term "user equipment" or "UE" refers to a mobile device, Machine-to-Machine (M2M) device or Internet of Things (IoT) device operated by an end user. Examples of UE 110 include smartphones, smartwatches, computers, cameras, and sensors operated by end users, among others. Likewise, as used herein the term "beacon" refers to a device having a fixed position that exchanges signals which may be used to determine a position of the UE. Examples of beacons 140 include Wi-Fi APs, cellular base stations, BLE transmitters, among other devices. Further, as used herein the term "RTT capabilities" refers the ability of a beacon to measure RTT (or sub types thereof, such as multi-RTT) in general, and provide measured RTT to other devices. RTT capabilities may be according to FTM protocol of the IEEE 802.11mc standard, 3GPP Release 16 TS series 37 and 38, or other protocols and standards. Still further, as used herein the term "RTT measurement status" refers to the ability of a beacon to perform a specific measure RTT measurement. RTT measurement status may be according to FTM protocol of the IEEE 802.11mc standard, 3GPP Release 16 TS series 37 and 38, or other protocols and standards.

UE 110 typically includes a central processor unit (CPU) 115, storage 120 (e.g., volatile and non-volatile memory) that maintains application software including a positioning client 122, one or more wireless network interfaces 125 (e.g., a Wi-Fi interface operating according to a IEEE 802.11 standard, a cellular radio operating according to 3GPP Release 16 TS series 37 and 38, and/or another type of wireless interface), a GNSS receiver 130 that receives satellite signals, among a number of other components.

The positioning client 122 typically utilizes a wireless network interface to scan for beacons 140 (e.g., Wi-Fi APs, cellular base stations, BLE transmitters, etc.) within range of the UE 110 and to determine characteristics thereof. These characteristics may be used in conjunction with a local copy of beacon information to determine a position of the UE 110. Likewise, the positioning client 122 may utilize the GNSS receiver 130 to capture raw GNSS measurements (e.g., psuedoranges) from satellites. The raw GNSS measurements may also be used to determine a position of the UE (i.e. a GNSS position fix).

The UE 110 may communicate via a Wi-Fi or cellular data communication path to the Internet 150 and a cloud-based location platform 160. Among other functions, the location platform 160 typically maintains the beacon database 170. A portion of the beacon database 170 may be designated as a RTT database 175, and relate an identifier of a beacon (e.g., a media access control (MAC) address, cell identifier (ID), etc.) to various RTT-related information, such as the beacon's RTT capabilities (e.g., RTT capable, RTT incapable or having unknown RTT capabilities), a RTT bias, a beacon physical antenna position, a position uncertainty, etc. Portions of the beacon database (including the RTT database 175) that cover a specific geographic area (e.g., tiles) may be downloaded by the positioning client 122 to the UE 110 for use as the local copy. Further, information derived from scans performed by the UE 110 (e.g., a determined position of the UE, beacon identities, RTT measurement status, RTT measurements, etc.) may be periodically uploaded to the cloud-based location platform 160 which uses the information to update to the beacon database 170 (including the RTT database 175).

Figure 2:
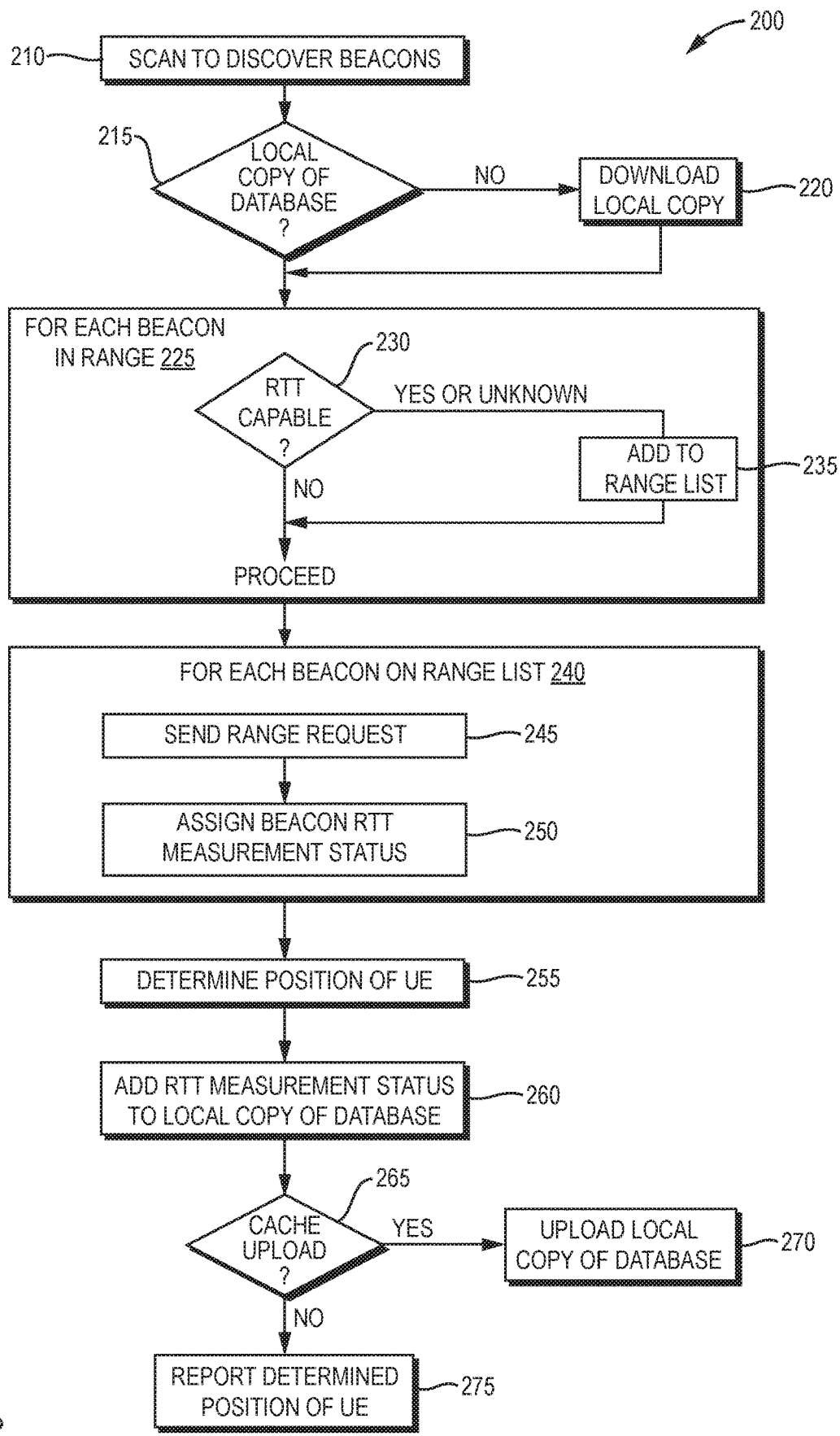
FIG. 2 is a flow diagram detailing example operations performed under direction of the positioning client on UE to crowd-source beacon RTT capabilities.

FIG. 2 is a flow diagram detailing example operations 200 performed under direction of the positioning client 122 on UE 110 to crowd-source beacon RTT capabilities. At step 210, the positioning client 122 uses a wireless network interface 125 of the UE 110 to perform a scan to discover beacons 140 within range of the UE. The scan may be an active scan (e.g., in response to a present request to compute UE position for an application executing on the UE 110), or a background scan (e.g., a background operation absent any present request to determine position of the UE). At step 215, for implementations that utilize local copies of portions of the beacon database 170 that cover geographic areas (e.g. tiles), the positioning client 122 checks whether the UE 110 is storing a local copy of a portion of the beacon database 170 (e.g., a tile) that covers the geographic area including the present position of the UE 110. If not, at step 220, it downloads a local copy (e.g., tile) from the cloud-based location platform 160. This may occur each time the UE is in a new geographic area or when previously downloaded local copies (e.g., tiles) have aged out. It should be understood that some implementations may not use local copies (e.g., tiles), and in such case steps 215-220 may be omitted.

At step 225, the positioning client 122 loops through each beacon 140 within range of the UE 110, and, at step 230, checks to determine whether RTT capabilities are already known. In an embodiment that use local copies (e.g., tiles) this may involve checking the beacon's identity in the local copy (e.g., tile). Alternatively, this may involve querying the cloud-based location platform 160. RTT capabilities may have a number of states, including RTT capable (i.e. a state indicating some other UE has been able to have the beacon measure RTT in the past), RTT incapable (i.e. a state indicating other UE have tried to have the beacon measure RTT in the past but none have been able to) or having unknown RTT capabilities (i.e. a state indicating no UE has tried measuring RTT in the past). At step 235, for each beacon 140 within range of the UE 110 indicated to be RTT capable or having unknown RTT capabilities, the positioning client 122 adds the beacon to a range list (i.e. a list of identifiers (e.g., MAC addresses, cell IDs, etc.) designated to receive range requests.

At step 240, the positioning client 122 loops through each beacon 140 on the range list, and at step 245 causes the wireless network interface 125 to send a range request (e.g., a FTM protocol range request according to the IEEE 802.11mc standard, or a request according to another standard) to attempt to have the beacon 140 measure RTT with it. At step 250, the positioning client 122 assigns the beacon 140 a RTT measurement status that indicates the beacon's RTT capabilities. The assigned RTT measurement status may indicate the beacon is RTT capable (i.e. the beacon was able to measure and return RTT), RTT incapable (i.e. the beacon was not able to measure and return RTT), or RTT out-of-range (i.e. the beacon was not able to measure RTT, but the beacon returned an out-of-range indication, such that the beacon may be able to measure and return RTT if the range were less).

At step 255, the positioning client 122 determines position of the UE 110. The determination may be based on GNSS such that the determined position is a GNSS position fix. Alternatively, or additionally, the determination may utilize RTT-based positioning. Such RTT-based positioning may utilize a hybrid positioning algorithm that combines a RTT-based WLS positioning algorithm and an Extended Kalman positioning algorithm, as discussed in more detail below. A position confidence (e.g., an estimated horizontal position error (HPE)) may be calculated for the determined position of the UE 110.

At step 260, in implementations that utilize caching, the positioning client 122 adds RTT information for the beacons within range to a local cache of the positioning client 122 on the UE 110. The RTT information may include the determined position of the UE (and in some cases position confidence), and for each beacon the identifier of the beacon (e.g., MAC address, cell ID, etc.), the RTT measurement status (e.g., RTT capable, RTT incapable, or RTT out-of-range), and, if available, a RTT measurement. At step 265, the positioning client 122 determines whether a cache upload trigger has been reached. The trigger may be the local cache becoming full, a certain amount of time expiring, or some other criteria that is periodically met. If the trigger has been reached, at step 270, the positioning client 122 uploads contents of the local cache to the cloud-based location platform 160 for inclusion in an update to the beacon database 170 (or more specifically, the RTT database 175 thereof). It should be understood that some implementations may not use caching, and in such case steps 260-265 may be omitted and the upload of step 270 commenced immediately when there is new RTT information for the beacons. Finally, at optional step 275, the positioning client 122 reports the determined position of the UE to other application software (e.g., if the original scan was an active scan).

Figure 3:
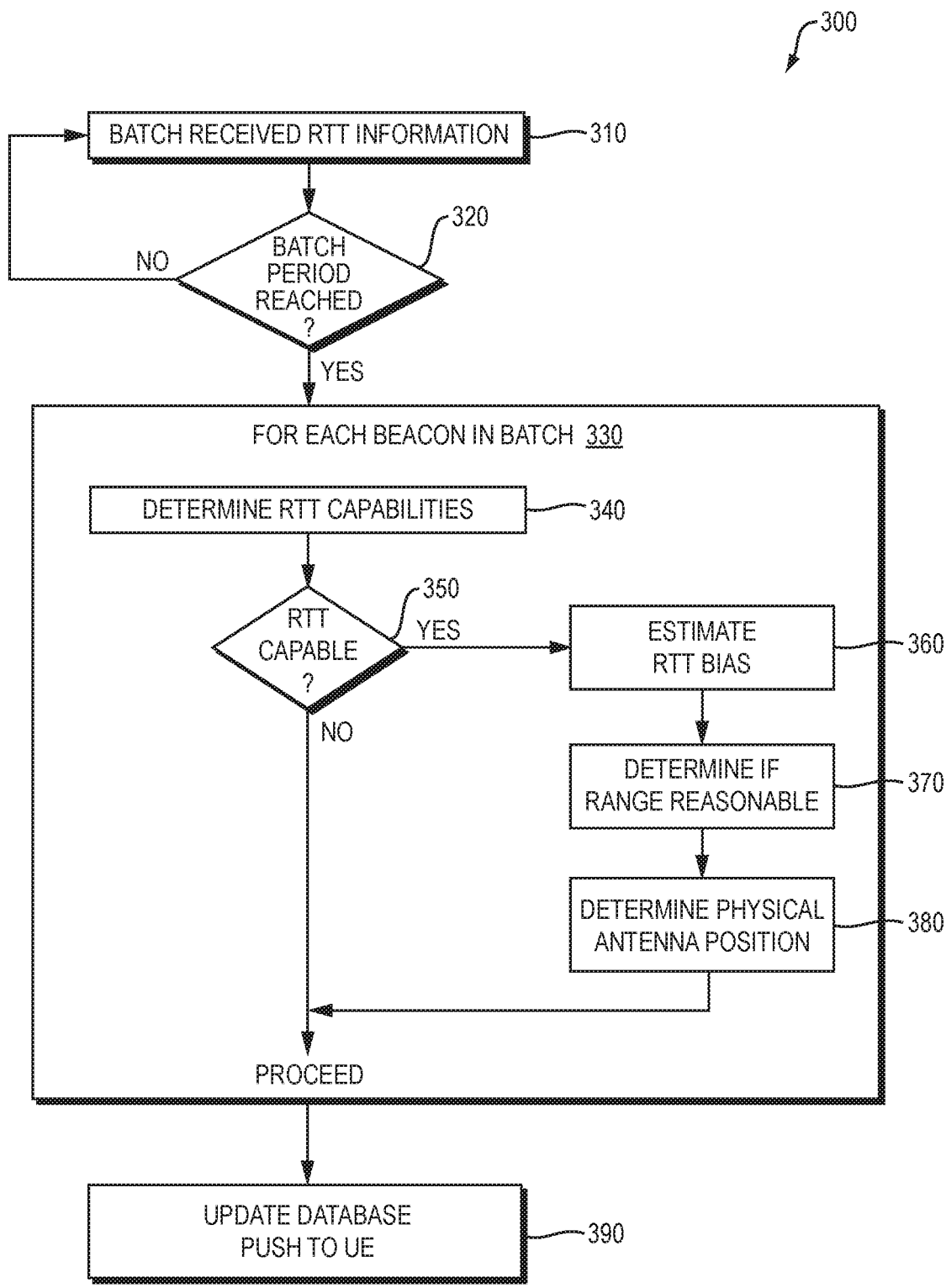
FIG. 3 is a flow diagram detailing example operations performed by the cloud-based location platform to crowd-source beacon RTT capabilities.

FIG. 3 is a flow diagram detailing example operations 300 performed by the cloud-based location platform 160 to crowd-source beacon RTT capabilities. The operations may aggregate information discovered by a large number of UE 110 to build the beacon database 170 (and the RTT database 175 thereof). At step 310, the cloud-based location platform 160 batches received RTT information from UE 110. As discussed above, the RTT information may include the determined position of the UE, and for each beacon 140 within range of the EU, the identifier of the beacon (e.g., MAC address, cell ID, etc.), the RTT measurement status (e.g., RTT capable, RTT incapable, or RTT out-of-range), and, if available, the RTT measurement.

At step 320, in implementations that batch updates, the cloud-based location platform 160 determines a batch period has been reached. The batch period may be a period of time (e.g., once a month), or a non-time based trigger, at which RTT capabilities of beacons 140 in the beacon database 170 are updated. It should be understood that some implementations may not use batching, in which case step 320 may be omitted and an operations commenced in real-time.

At step 330, the cloud-based location platform 160 loops through each beacon 140 in the batch, iterating through identifiers (e.g., MAC address, cell ID, etc.) and examining an aggregate of the RTT information for the beacon. At step 340, the cloud-based location platform 160 determines RTT capabilities of the beacon 140 based on the RTT measurement status in the RTT information for the beacon. The beacon 140 may be marked RTT capable if the RTT measurement status from at least one UE 110 indicates it is RTT capable. The beacon 140 may be marked RTT incapable if the RTT measurement status from all of the UE 110 indicates it is RTT incapable. The beacon 140 may be marked as having unknown RTT capabilities if the RTT measurement status from at least one UE 110 indicates the beacon is RTT out-of-range (but the RTT measurement status of no UE 110 indicates the UE is RTT capable).

At step 350, the cloud-based location platform 160 determines if the RTT capabilities of the beacon 140 indicate it is RTT capable. If not, execution loops to examine the next beacon. If so, execution proceeds to step 360, where the cloud-based location platform 160 estimates an RTT bias for the beacon 140 that measures an expected offset/error in RTT measurements by the beacon. The RTT bias may be estimated using various techniques. For example, a delta may be computed between a RTT-determined distance between the UE 110 and the beacon 140 and a position-fix-determined distance between the UE and the beacon. If the delta is substantially the same across a number of (e.g., all) UE 110 that have observed the beacon 140, the delta may be used as the RTT bias of the beacon. Also, the cloud-based location platform 160 may determine other beacons 140 that share a common organization identifier (e.g., organizationally unique identifier (OUI)) with the beacon. If a number of these other beacons share substantially the same RTT bias, this RTT bias may be assumed for the present beacon. This may permit the estimation of RTT bias in situations where delta computations are not possible.

At step 370, the cloud-based location platform 160 determines whether distance (range) between the UE 110 and the beacon 140 computed based on RTT is reasonable. For example, it may be determined if the distance is consistent with distance between the position of the UE 110 using other techniques (e.g., a GNSS position fix) and the beacon position in the beacon database 170. If the RTT-based distance is not reasonable, the RTT capabilities of the beacon 140 are updated (e.g., to mark the beacon as RTT incapable).

At step 380, the cloud-based location platform 160 determines physical antenna position of the beacon 140. The determination uses a trilateration algorithm (e.g., a WLS multilateration algorithm) that takes RTT measurements from multiple UE. Details of example operations to determine physical antenna position are discussed below.

When execution is done looping through each of the beacons, at step 390, the cloud-based location platform 160 updates the beacon database 170 (or more specifically the RTT database 175 thereof) to include the new RTT capabilities. Thereafter, in implementations that utilize local copies (e.g., tiles), portions of the updated beacon database 170 may be provided back to UE 110 to inform them of RTT capabilities of beacons, so they can perform RTT-based positioning.

Figure 4:
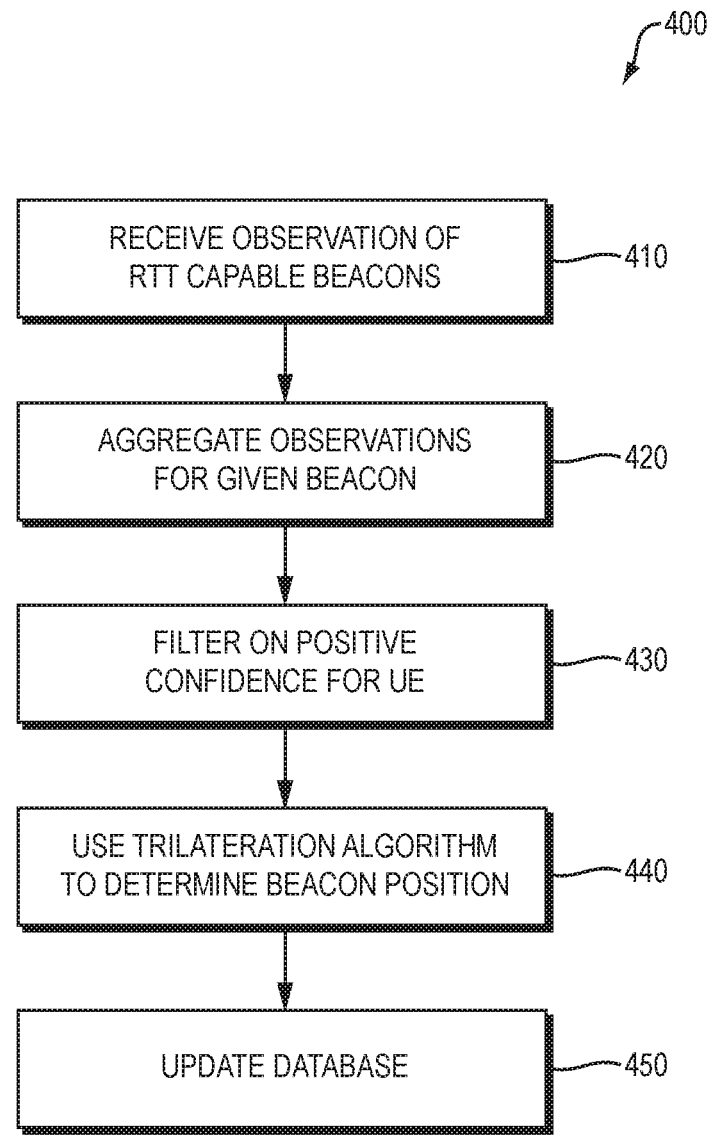
FIG. 4 is a flow diagram detailing example operations performed by the cloud-based location platform to determine beacon position, or more specifically beacon physical antenna position, using RTT measurements crowd-sourced from UE.

FIG. 4 is a flow diagram detailing example operations 400 performed by the cloud-based location platform 160 to determine beacon position, or more specifically beacon physical antenna position, using RTT measurements crowd-sourced from UE 110. At step 410, the cloud-based location platform 160 receives observations from UE 110 of RTT capable beacons 140. The observations may include the determined position of the UE (e.g., a GNSS position fix) and a position confidence of the determined position (e.g., an HPE of the GNSS position fix), an identifier of the beacon (e.g., MAC address, cell ID, etc.) and RTT information. The RTT information may include a RTT measurement, a RTT measurement uncertainty, a signal strength associated with the RTT measurement, a bandwidth associated with the RTT measurement, as well as other RTT-related data. At step 420, the cloud-based location platform 160 aggregates observations for a given beacon 140. At step 430, the cloud-based location platform 160 filters out observations based on a comparison of the position confidence of the determined position of the UE (e.g., the HPE of the GNSS position fix) and a threshold. Preferably, the threshold is set to remove only observations with very poor position confidence (e.g., observations with very large HPE). Moderately confident observations may be addressed by weighting in subsequent operations.

At step 440, the cloud-based location platform uses a trilateration algorithm to determine beacon position, or more specifically beacon physical antenna position, based on the aggregated observations from the UE 110. The trilateration algorithm may be a WLS multilateration algorithm in which the weight is a function of confidence of the determined position of the UE (e.g., the HPE of the GNSS position fix), RTT measurement uncertainty, a RTT-determined range (e.g., with measurements from longer range being considered less reliable), signal strength associated with the RTT measurement, a number of RTT measurements, and the bandwidth associated with the RTT measurement (e.g., with higher bandwidths considered to have lower error). In some cases, the WLS multilateration algorithm may also consider, other information (e.g., RSS, angle of arrival (AoA), etc.), applying weights thereto based on uncertainty (e.g., higher weights to RSS measurements since RSS may have high uncertainty than RTT). At step 450, the cloud-based location platform updates the beacon database to include the determined position of the beacon 140, or more specifically the determined physical antenna position of the beacon. Thereafter, portions (e.g., tiles) of the updated beacon database 170 may be provided back to UE 110, such that the determined physical antenna position of the beacon can be used in RTT-based positioning of UE.

Figure 5:
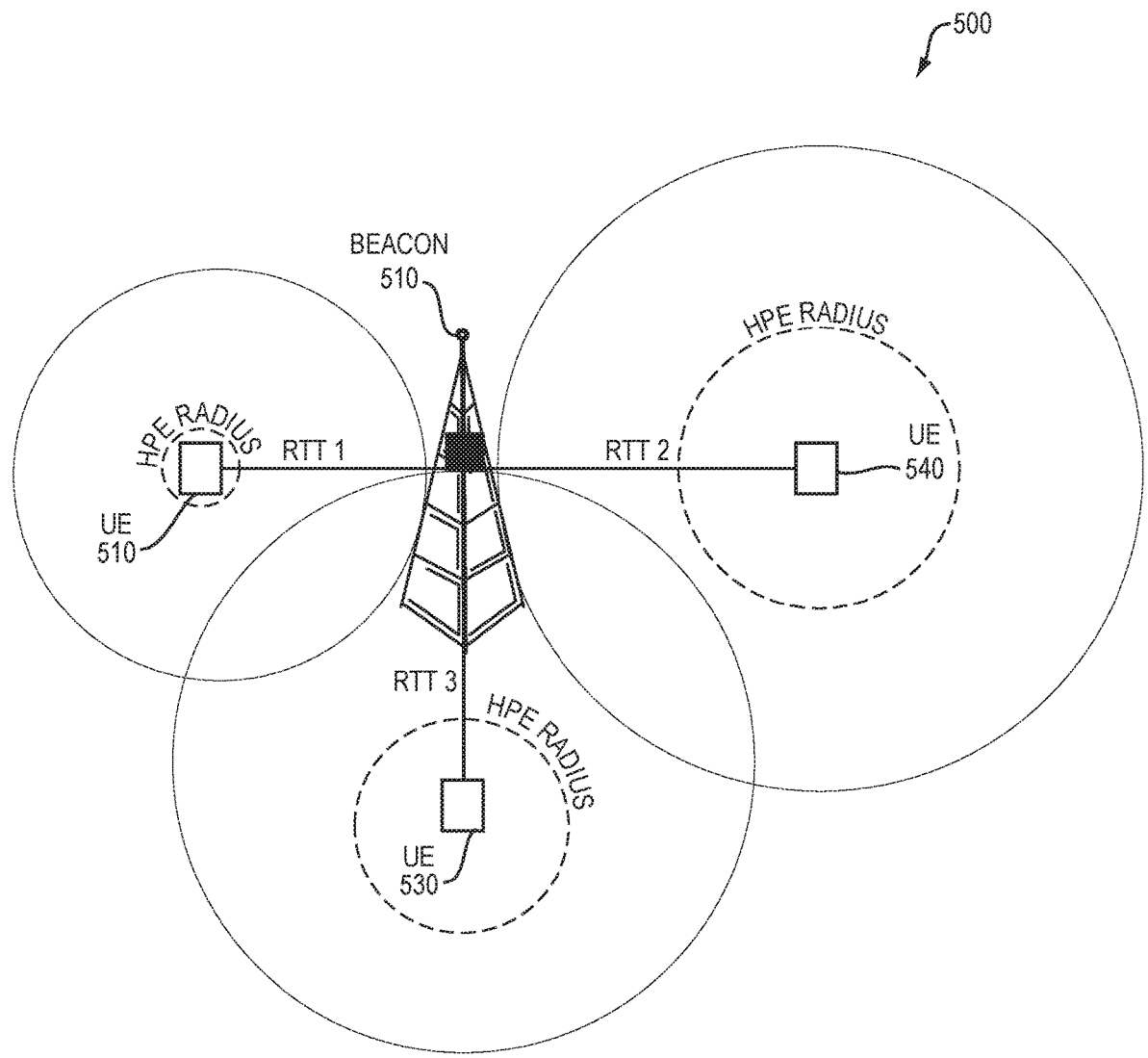
FIG. 5 is a diagram of an example arrangement of UE illustrating HPE and its use as an indicia of accuracy of a position determination.

Accuracy of the trilateration often may be improved by using determined positions of UE that have very good position confidence. In the case where the determine position is a GNSS position fix, very good position confidence may be measured as very low HPE. FIG. 5 is a diagram of an example arrangement 500 of UE 110 illustrating HPE and its use as an indicia of accuracy of a position determination. The position of beacon 510 may be determined by a trilateration that uses the GNSS position fix of UE 520-540, which each have an HPE represented by a circle having a given radius. In particular, the HPE of UE 540 is somewhat large, indicating there is low confidence in this position. The position of UE 540 may be very inaccurate, which could be affecting accuracy of the trilateration. If the accuracy of the position of UE 540 could be improved, accuracy of the trilateration could likely also be improved.

One technique to improve accuracy of the position determination for UE 110 involves a RTK correction service. In a traditional implementation "on board" implementation of RTK correction, the GNSS receiver 130 in the UE 110 is RTK capable and interacts with an independent network of RTK base stations that provide real time corrections that are applied at the UE. However, RTK capable GNSS receivers are generally quite expensive and are not commonly deployed in low-cost UE (e.g., smartphones, smartwatches, etc.). Accordingly, if operations are restricted to being "on board", many UE 110 cannot obtain the benefits of RTK correction.

Figure 6:
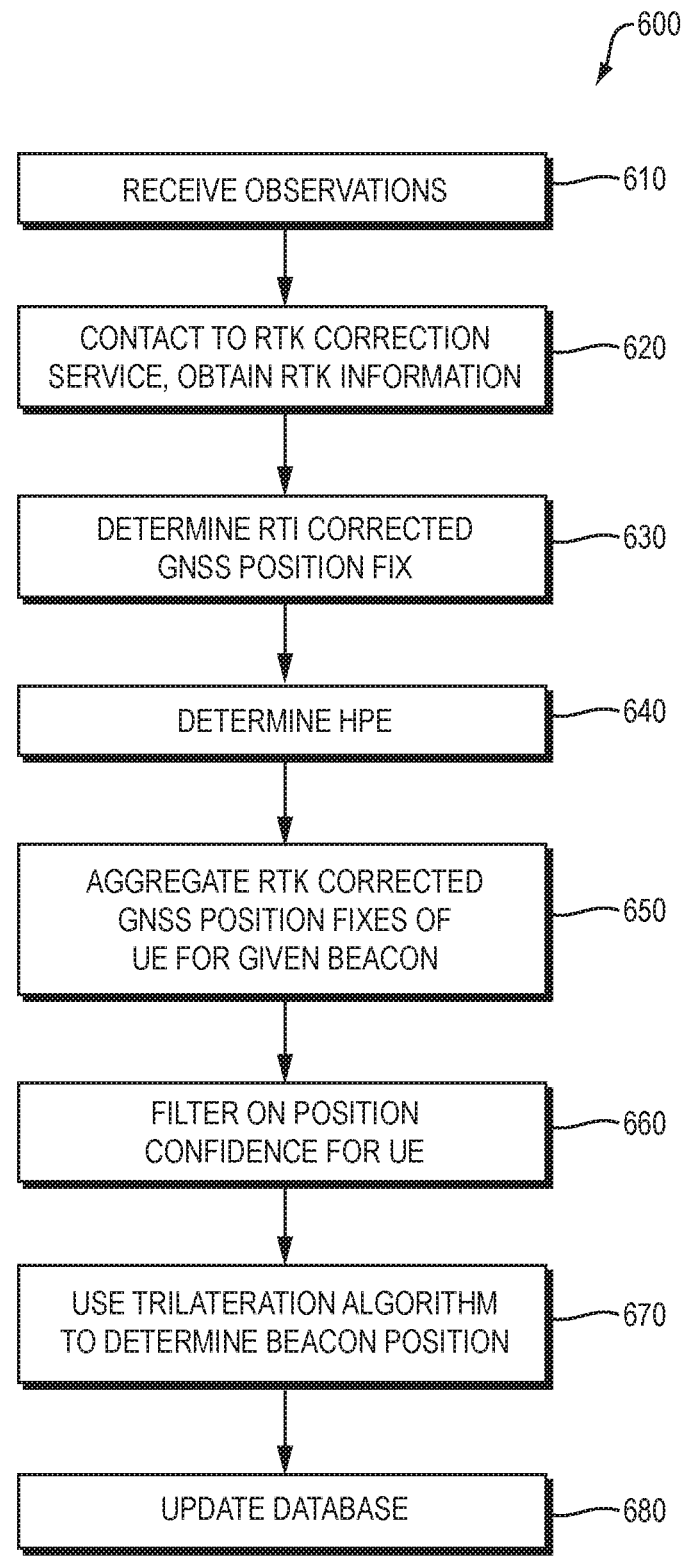
FIG. 6 is a flow diagram detailing example operations performed by the cloud-based location platform in an "off-board" implementation to determine beacon position, or more specifically beacon physical antenna position, using a cloud-based RTK GNSS position fix.

This limitation may be addressed by an "off-board" implementation where the raw GNSS measurements (e.g., psuedoranges) from the UE 110 are provided to the cloud-based location platform 160, which performs the RTK GNSS position fix. FIG. 6 is a flow diagram detailing example operations 600 performed by the cloud-based location platform 160 in an "off-board" implementation to determine beacon position, or more specifically beacon physical antenna position, using a cloud-based RTK GNSS position fix. At step 610, the cloud-based location platform 160 receives observations from UE 110 of RTT capable beacons. The observations may include one or more sets of raw GNSS measurements (e.g., psuedoranges) from the GNSS receiver 130 of the UE 110, an identifier of the beacon (e.g., MAC address, cell ID, etc.) and RTT information. The RTT information may include a RTT measurement, a RTT measurement uncertainty, a signal strength associated with the RTT measurement, a bandwidth associated with the RTT measurement, as well as other RTT-related data. At step 620, the cloud-based location platform 160 connects to a RTK correction service via the Internet 150 and obtains RTK correction information. At step 630, for each set of raw GNSS measurements the cloud-based location platform 160 determines a corrected GNSS position fix for the UE 110 using the raw GNSS measurements and the RTK correction information. At step 640, the cloud-based location platform 160 determines HPE of the resulting corrected GNSS position fix for each of the UE 110. This corrected GNSS position fix generally will have a much lower HPE than a GNSS position fix produced by UE themselves.

At step 650, the cloud-based location platform 160 aggregates observations, including the cloud-based RTK GNSS position fixes of UE, for a given beacon. At step 660, the cloud-based location platform 160 filters out observations based on a comparison of the HPE of the GNSS position fix with a threshold. At step 670, the cloud-based location platform 160 uses a trilateration algorithm to determine to beacon position, or more specifically beacon physical antenna position, based on the aggregated observations from the UE 110. The trilateration algorithm may be a WLS multilateration algorithm with weights as described above, with the exception that HPE of the corrected GNSS position fix is used instead of HPE from the UE 110. At step 680, the cloud-based location platform 160 updates the beacon database 170 to include the determined position of the beacon 140, or more specifically the determined physical antenna position of the beacon. Thereafter, portions (e.g., tiles) of the updated beacon database 170 may be provided back to UE.

The portions (e.g., tiles) of the updated beacon database 170 may be locally cached and used by UE 110 to perform RTT-based positioning. A number of different RTT-based positioning algorithms may be used that base the position determination solely on RTT measurements, or that use RTT in combination with other information (e.g., RSS, AoA, etc.). In one embodiment, a hybrid RTT-based positioning algorithm is utilized that hybridizes a WLS positioning algorithm and an extended Kalman filter positioning algorithm.

Figure 7:
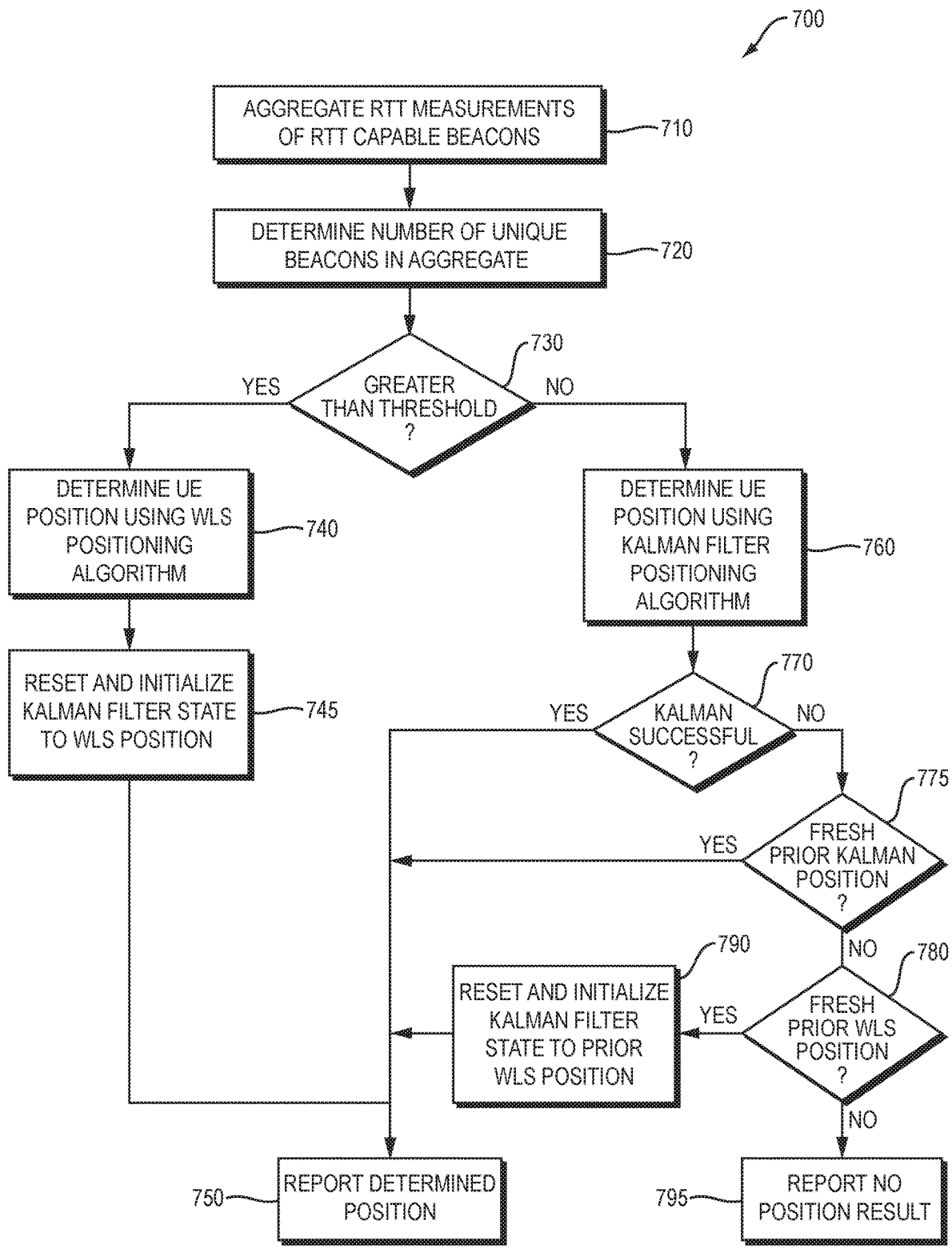
FIG. 7 is a flow diagram detailing example operations performed by a positioning client on a UE to implement a hybrid RTT-based positioning algorithm to determine UE position.

FIG. 7 is a flow diagram detailing example operations 700 performed by a positioning client 122 on a UE 110 to implement a hybrid RTT-based positioning algorithm to determine UE position. At step 710, the positioning client 122 aggregates RTT measurements by RTT capable beacons in range of the UE 110 over a period of time (e.g., a one second period). At step 720, the positioning client 122 determines a number of unique beacons 140 in the aggregation for which information (e.g., beacon positions) are available in portions (e.g., tiles) of the beacon database 170 locally cached by the UE 110. At step 730, the positioning client 122 determines whether the number of unique beacons is greater than a threshold (e.g., one beacon). If the number of unique beacons is greater than the threshold, execution proceeds to step 740, where UE position is determined by a WLS positioning algorithm. The weights used in the WLS positioning algorithm may be based on the number of RTT measurements, confidence of the determined position of the beacons (e.g., HPE), RTT measurement uncertainty, and/or other factors. A WLS position uncertainty (e.g., a WLS position HPE) may also be produced as part of step 740. At step 745, the positioning client 122 resets and initializes Kalman filter state to be equal to the determined WLS position. Then, at step 750, the positioning client 122 reports the determined WLS position as the position of the UE 110 (e.g., to an application executing on the UE).

If the number of unique beacons is not greater than the threshold, execution proceeds to step 760, where UE position is determined by a Kalman filter positioning algorithm. If Kalman filter state were previously initialized to be equal to the determined WLS position as part of step 745, such initialization is used. If not, Kalman filter state may be initialed to a median beacon location of the unique beacons. At step 770, the positioning client 122 determines whether the Kalman filter positioning algorithm was successful, and if so, at step 750, the positioning client 122 reports the determined Kalman position as the position of the UE 110.

If the Kalman filter positioning algorithm was not successful, at step 775, the positioning client 122 determines whether there was a prior Kalman position returned within a freshness interval (e.g., 2 seconds), and if so, at step 750, the positioning client 122 reports the prior Kalman position as the position of the UE 110 (e.g., to an application executing on the UE). If there was no prior Kalman position returned within the freshness interval, at step 780, the positioning client 122 determines whether there was a prior WLS position returned within the freshness interval. If so, at step 750, the positioning client 122 resets and initializes Kalman filter state to be equal to the prior WLS position at step 790 reports the prior WPS position as the position of the UE 110, and at step 750. If there was no prior WLS position returned within the freshness interval, at step 795, the positioning client 122 reports no position result for the UE 110.

It should be understood that in addition to basing position determination solely on RTT measurements, positioning algorithms may use RTT in combination with other information (e.g., RSS, AoA, etc.) to determine position. In some cases, RTT measurements may be used to improve accuracy of techniques that primarily utilizes another form of beacon data (e.g., RSS). For example, a positioning algorithm may use multiple RSS measurements for beacons in a weighted trilateration to estimate UE position. RTT measurements may be used to adjusts the RSS measurements, filter out potentially erroneous RSS measurements, adjust weights assigned to beacons in the weighted trilateration and/or in other manners to improve the accuracy of the RSS positioning.

The above description details various crowd sourcing techniques to enable RTT-based positioning of UE 110. It should be understood that the techniques and portions thereof may be utilized together, individually, or in combination with other techniques, depending on the implementation. Further, it should be understood that aspects of the techniques may be modified, added to, removed, or otherwise changed depending on the implementation. Further, while specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory electronic device-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method to enable round-trip time (RTT)-based positioning, comprising:
   providing, by a cloud-based location platform to a plurality of user equipment (UE), information regarding RTT capabilities of beacons from a beacon database, at least one of the beacons initially having unknown RTT capabilities;
   receiving, by the cloud-based location platform, RTT information including at least RTT measurement status from one or more of the plurality of UE that have attempted to measure RTT with a beacon of the beacons initially having unknown RTT capabilities;
   determining RTT capabilities of the beacon based on the received RTT measurement status; and
   updating the beacon database to include information indicating the RTT capabilities of the beacon,
   such that the cloud-based location platform both provides information regarding RTT capabilities of beacons from the beacon database that are consumed by the one or more UE, and receives information regarding RTT capabilities of beacons contributed to the beacon database from the one or more UE.

2. The method of claim 1, wherein the beacons are Wi-Fi access points (APs) and the RTT capabilities include support for fine timing measurement (FTM) protocol according to a Institute of Electrical and Electronics Engineers (IEEE) 802.11mc standard.

3. The method of claim 1, wherein the beacons are cellular base stations, the RTT capabilities include support for 3rd Generation Partnership Project (3GPP) Release 16, and the RTT is multi-RTT.

4. The method of claim 1, wherein the determining comprises:
   marking the beacon is RTT capable if the measurement status from at least one of the one or more UE indicates the UE has been able to have the beacon measure RTT, marking the beacon as RTT incapable if the RTT measurement status from all of the one or more UE indicate the UE have been unable to have the beacon measure RTT, and marking the beacon as having unknown RTT capabilities if the RTT measurement status from at least one of the one or more UE indicates the UE is out of range to measure RTT and the RTT measurement status from all other of the one or more UE indicates the UE have been unable to have the beacon measure RTT.

5. The method of claim 1, further comprising:
   in response to the RTT capabilities of the beacon indicating that the beacon is RTT capable, estimating an RTT bias for the beacon that measures an expected error in RTT measurements by the beacon, and
   wherein the updating comprises adding information indicating the RTT bias for the beacon to the beacon database.

6. The method of claim 5, wherein the estimating comprises:
   computing a delta for a distance between a UE and the beacon computed based on RTT and a distance between the UE and the beacon computed based on a determined position of the UE position and an estimated position of the beacon, and determining the RTT bias of the beacon based on the delta.

7. The method of claim 5, wherein the estimating comprises:
   determining one or more other beacons that share a common organization identifier with the beacon; and
   determining the RTT bias of the beacon based on an RTT bias of the one or more other beacons.

8. The method of claim 1, further comprising:
   in response to the RTT capabilities of the beacon indicating that the beacon is RTT capable, determining whether a distance between a UE and the beacon computed based on RTT is consistent with a determined position of the UE, and if the distance is not consistent updating the RTT capabilities.

9. The method of claim 1, further comprising:
   determining physical antenna position of the beacon by a trilateration algorithm that uses RTT measurements from the plurality of UE, and wherein the updating includes adding the physical antenna position of the beacon to the beacon database.

10. The method of claim 1, wherein the determining RTT capabilities and updating the beacon database are performed periodically according to a batch period.

11. A non-transitory electronic device readable media having software stored thereon, the software when executed on one or more processors of one or more electronic devices operable to:
receive a round-trip time (RTT) measurement from a plurality of user equipment (UE) that have attempted to measure RTT with a beacon initially having unknown RTT capabilities;
determine the beacon is RTT capable and a position of the beacon based on the RTT measurement from the plurality of UE;
update a beacon database to include information indicating the beacon is RTT capable and the determined position of the beacon; and
provide information including an indication the beacon is RTT capable and the determined position of the beacon to at least one UE as part of a set of beacon information for a geographic area usable to estimate position of the UE.

12. The non-transitory electronic device readable media of claim 11, wherein the beacons are Wi-Fi access points (APs) and a beacon is RTT capable when it supports fine timing measurement (FTM) protocol according to a Institute of Electrical and Electronics Engineers (IEEE) 802.11mc standard.

13. The non-transitory electronic device readable media of claim 11, wherein the beacons are cellular base stations, the RTT capabilities include support for 3rd Generation Partnership Project (3GPP) Release 16, and the RTT is multi-RTT.

14. The non-transitory electronic device readable media of claim 11, wherein the beacon is determined RTT capable in response to at least one of the plurality of UE having been able to have the beacon measure RTT.

15. The non-transitory electronic device readable media of claim 11, wherein the software is further operable to:
estimate an RTT bias for the beacon that measures an expected error in RTT measurements by the beacon, and
add information indicating the RTT bias for the beacon to the beacon database.

16. The non-transitory electronic device readable media of claim 11, wherein the software is further operable to:
determine the distance between each UE and the beacon computed based on RTT is consistent with a determined position of the UE.

17. The non-transitory electronic device readable media of claim 11, wherein the software is further operable to:
determine physical antenna position of the beacon by a trilateration algorithm that uses RTT measurements from the plurality of UE, and
add the physical antenna position of the beacon to the beacon database.

* * * * *